April 5, 1927.  E. A. SMITH ET AL  1,623,321

AGRICULTURAL IMPLEMENT

Filed Sept. 15, 1924

INVENTORS
Evander A. Smith
BY Edward R. Finch

Hardway Cathey
ATTORNEYS

Patented Apr. 5, 1927.

1,623,321

UNITED STATES PATENT OFFICE.

EVANDER A. SMITH AND EDWARD R. FINCH, OF HOUSTON, TEXAS.

AGRICULTURAL IMPLEMENT.

Application filed September 15, 1924. Serial No. 737,776.

This invention relates to new and useful improvements in an agricultural implement.

One object of the invention is to provide an implement of the character described which may be used as a hand cultivator and may be converted into a wheelbarrow to be used either independently, or in combination with said implement.

With the above and other objects in view this invention has particular relation to certain novel features of construction, operation and arrangement of parts, an example of which is given in this specification and illustrated in the accompanying drawings, wherein:—

Figure 1:
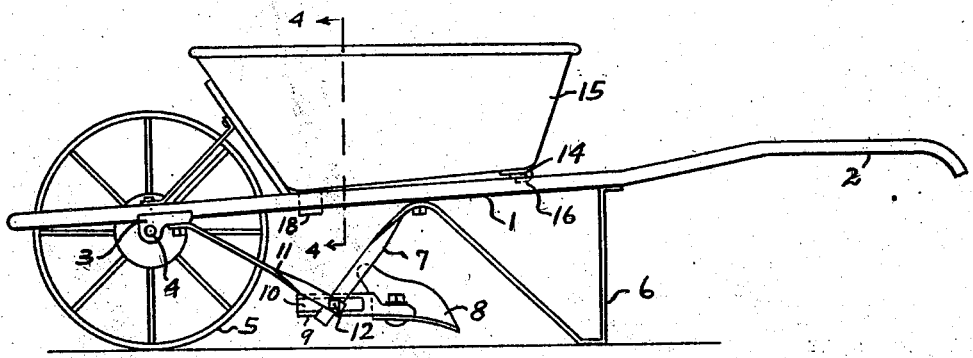
Figure 1 shows a side view of the device when used as a wheelbarrow.

Referring now more particularly to the drawings, wherein like numerals of reference designate similar parts in each of the figures, the numeral 1 designates an A-frame, forming the main framework and whose side members are extended rearwardly forming the handles 2, 2.

Near its forward end the side members of this frame have the transverse aligned bearing members 3, 3 in which the ends of the axle 4 have bearings. Fixed on this axle between said side members there is the carrier wheel 5.

Depending from each side member of the frame there is a supporting leg 6, said legs preferably being formed of strap iron having the forwardly extended declining ends 7, 7 which converge and form the plow stock.

The numeral 8 designates a plow share which is fastened to the plow beam 9 which has the shallow side grooves, as 10, in which the ends 7 fit when the share is in use. There are side braces 11, 11 which are bolted, at their forward ends, to the respective bearing members 3 and whose other ends embrace the extended ends 7 and a bolt 12 passed through said braces and the extended ends 7 and the plow beam 9, as well, and is secured in place by the nut 13. The strap ends 7 are thus clamped seated in the grooves 10 and the share is thus held in rigid position for use.

Figure 2:
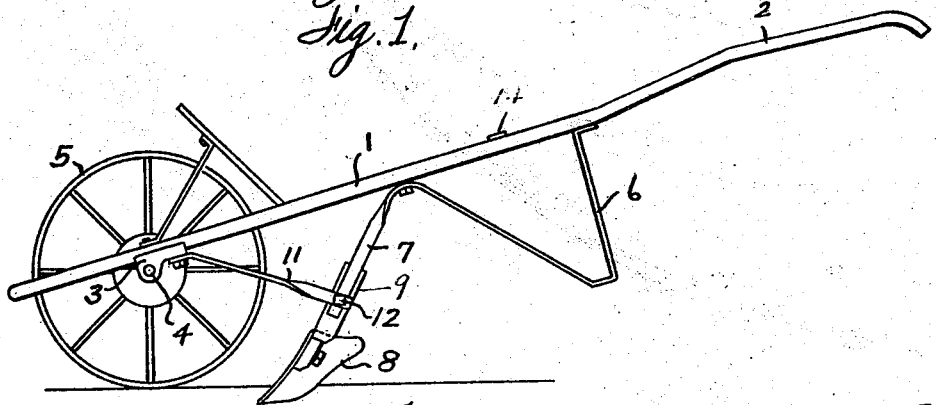
Figure 2 shows a side view of the device adapted to be used as cultivator.

The frame 1 has a cross bar 14 secured to the side members thereof and a removable body 15 is provided whose rear end, underneath has the clamps, as 16 to engage with said cross bar 14, as shown in Figure 2.

Underneath the forward end of the body there is a strap 17, secured to it, having the downwardly curved ends forming the side clamps 18, 18 which engage with the respective side members of the framework. Inasmuch as these side members diverge rearwardly the body may be removed by moving it rearwardly to disengage the clamps 16 and 18 and then lifted off.

Figure 3:
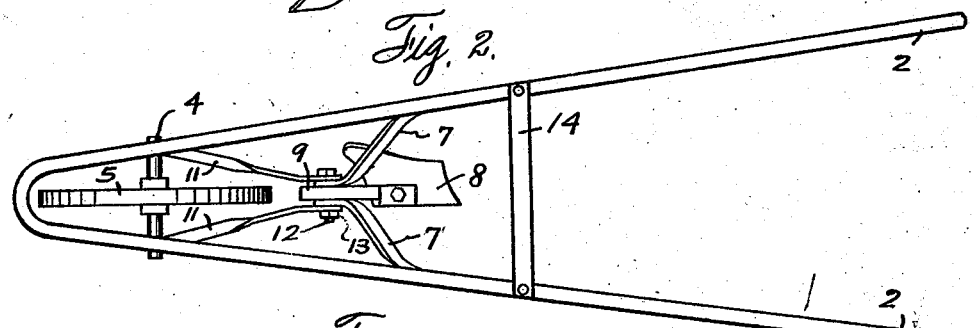
Figure 3 shows a plan view thereof.
Figure 4:
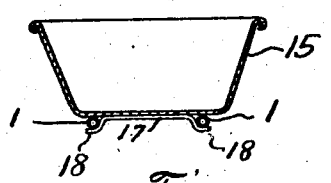
Figure 4 shows a transverse sectional view taken on the line 4—4 of Figure 1.

The body 15 may be used in combination with the plow for carrying fertilizer, seed and the like to be used as the ground is being cultivated, or the implement may be used independently, as a wheelbarrow for general purposes. When using the implement as a wheelbarrow only the nut 13 may be loosened and the share swung around rearwardly, out of the way, as shown in Figures 1 and 3 and said nut again tightened to hold the share in said position.

What we claim is:—

A ground working implement including a frame, a carrier wheel supporting one end of the frame, handles carried by the other end of the frame, straps forming supporting legs fastened to the frame and depending forwardly therefrom, a plow stock formed with side grooves in which the lower ends of the straps fit, means securing said ends in said grooves in such manner that said stock may be swung on said securing means, a share fastened to said stock, and depending therefrom, and braces fastened at their upper ends to the side members of the frame and at their lower ends to said stock for bracing same.

In testimony whereof we have signed our names.

EVANDER A. SMITH.
EDWARD R. FINCH.